United States Patent
Kawahara et al.

(10) Patent No.: US 9,446,647 B2
(45) Date of Patent: Sep. 20, 2016

(54) VEHICLE SUSPENSION APPARATUS AND METHOD OF ASSEMBLING VEHICLE SUSPENSION APPARATUS

(71) Applicant: TOYOTA JIDOSHA KABUSHIKI KAISHA, Toyota-shi, Aichi-ken (JP)

(72) Inventors: Daisuke Kawahara, Toyota (JP); Katsumi Ishida, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/652,618

(22) PCT Filed: Dec. 26, 2012

(86) PCT No.: PCT/JP2012/008327
§ 371 (c)(1),
(2) Date: Jun. 16, 2015

(87) PCT Pub. No.: WO2014/102861
PCT Pub. Date: Jul. 3, 2014

(65) Prior Publication Data
US 2015/0328947 A1    Nov. 19, 2015

(51) Int. Cl.
*F16F 9/38* (2006.01)
*B60G 15/06* (2006.01)
*F16F 9/32* (2006.01)

(52) U.S. Cl.
CPC ............ *B60G 15/062* (2013.01); *F16F 9/3207* (2013.01); *F16F 9/38* (2013.01); *B60G 2202/312* (2013.01); *B60G 2204/4308* (2013.01); *B60G 2206/80* (2013.01); *F16F 2226/04* (2013.01); *Y10T 29/49613* (2015.01)

(58) Field of Classification Search
CPC ....... F16F 9/38; F16F 9/3207; F16F 2226/04; B60G 15/062
USPC ........................................ 188/322.12, 322.19
See application file for complete search history.

(56) References Cited

U.S. PATENT DOCUMENTS

| | | | | | |
|---|---|---|---|---|---|
| 4,529,213 | A | * | 7/1985 | Goodman | F16F 9/38 188/322.12 |
| 4,969,542 | A | * | 11/1990 | Athmer | F16F 9/38 188/322.12 |
| 5,172,999 | A | * | 12/1992 | Ijima | B60G 15/063 267/122 |
| 5,402,868 | A | * | 4/1995 | Handke | F16F 9/58 188/322.12 |

(Continued)

FOREIGN PATENT DOCUMENTS

| DE | 9109020 U1 * | 10/1991 | ............... F16F 9/38 |
|---|---|---|---|
| DE | 44 40 808 C1 | 2/1996 | |

(Continued)

*Primary Examiner* — Thomas J Williams
(74) *Attorney, Agent, or Firm* — Oliff PLC

(57) ABSTRACT

A vehicle suspension apparatus includes: a shock absorber that has a cylinder outer tube; a dust cover whose upper area is fixed on an upper support side; and a coil spring that surrounds the dust cover. The outer tube has a first engagement unit provided on a portion of the circumference of the outer tube. The dust cover a second engagement unit provided on a portion of the circumference of a lower area of the dust cover. The second engagement unit becomes engaged with the first engagement unit. The first engagement unit provided around the outer tube and the second engagement unit provided around the lower area of the dust cover become engaged with each other by rotating the dust cover around the shaft of the shock absorber.

6 Claims, 7 Drawing Sheets

(56) References Cited

U.S. PATENT DOCUMENTS

| | | | | |
|---|---|---|---|---|
| 5,954,168 | A * | 9/1999 | Nakatani | F16F 9/38 188/322.12 |
| 6,042,092 | A * | 3/2000 | Shibata | F16F 9/38 267/122 |
| 7,364,177 | B2 * | 4/2008 | Handke | B60G 15/063 280/124.147 |
| 2003/0047897 | A1 * | 3/2003 | Hurrlein | B60G 15/062 280/124.147 |
| 2004/0168871 | A1 | 9/2004 | Handke et al. | |
| 2012/0241267 | A1 * | 9/2012 | Muraguchi | F16J 3/041 188/322.12 |
| 2015/0068855 | A1 * | 3/2015 | Matsumura | F16F 9/38 188/322.12 |
| 2015/0091257 | A1 * | 4/2015 | Matsumura | F16F 9/38 277/636 |
| 2015/0240903 | A1 * | 8/2015 | Nagai | F16F 1/126 188/322.12 |

FOREIGN PATENT DOCUMENTS

| | | | | |
|---|---|---|---|---|
| DE | 19641728 A1 * | 4/1998 | | F16F 9/38 |
| FR | 2 847 324 A1 | 5/2004 | | |
| GB | 1343422 A * | 1/1974 | | F16F 9/38 |
| JP | S62202548 U | 12/1987 | | |
| JP | H02132147 U | 11/1990 | | |
| JP | H06-53838 U | 7/1994 | | |
| JP | H0682446 U | 11/1994 | | |
| JP | H10203547 A | 8/1998 | | |
| JP | H11294511 A | 10/1999 | | |
| JP | 2002-310216 A | 10/2002 | | |
| JP | 2006349018 A | 12/2006 | | |
| JP | 2010078080 A | 4/2010 | | |

\* cited by examiner

VEHICLE SUSPENSION APPARATUS AND METHOD OF ASSEMBLING VEHICLE SUSPENSION APPARATUS

TECHNICAL FIELD

The present invention relates to a vehicle suspension apparatus including a dust cover and a method of assembling the vehicle suspension apparatus.

BACKGROUND ART

Conventionally, vehicle suspension apparatuses include, for example, a vehicle suspension apparatus described in Patent document No. 1. A vehicle suspension apparatus includes mainly a shock absorber, a coil spring, and a dust cover. The coil spring mainly supports the weight of a vehicle so as to absorb impacts. The shock absorber attenuates the vibration of the coil spring. The dust cover covers the periphery of a piston rod that extends and retracts from a cylinder outer tube of the shock absorber so as to prevent the attachment of foreign objects and dust to a sliding unit. An upper area of the dust cover is fixed to an upper support side, and a lower area thereof is fixed to the cylinder outer tube, substantially covering the piston rod. Thus, an effect of preventing intrusion of foreign objects or dust is high compared to a type of dust cover whose lower area is open.

In the assembly of such a suspension apparatus to a vehicle, a shock absorber is first connected to the lower-arm side, and a coil spring is set via a lower insulator on a lower spring seat formed around the cylinder outer tube of the shock absorber. Then, for example, a dust cover that is integrated with an upper support is inserted between the coil spring and a piston rod from above the piston rod, and the upper support and the upper end side of the piston rod are connected. After that, while lowering a lower area of the dust cover to a predetermined position of the cylinder outer tube by compressing the coil spring, the lower area of the dust cover is fit to a bracket that is formed along the circumference of the cylinder outer tube by sticking a hand in through a gap between wires of the coil spring.

[Patent document No. 1] Japanese Utility Model Application Publication No. S62-202548

DISCLOSURE OF THE INVENTION

Problem to be Solved by the Invention

However, in recent years, double wishbone type suspensions are often employed mainly in, particularly, luxury vehicles. Although double wishbone type suspensions have various advantages, the structure thereof is complicated and tends to have a narrow gap between wires of a coil spring compared to a strut type suspension having a simple structure. Therefore, there has been a problem where it is difficult to work to fit a lower area of a dust cover to a cylinder outer tube as described above while sticking a hand through a gap between wires of the coil spring, and the improvement of the working efficiency is thus difficult.

In this background, a purpose of the present invention is to provide a vehicle suspension apparatus that allows for efficient locking of a lower area of a dust cover to a cylinder outer tube even when the suspension apparatus has a narrow gap between wires of a coil spring just like a double wishbone type suspension or the like, and a method of assembling the vehicle suspension apparatus.

Means to Solve the Problem

A vehicle suspension apparatus according to one embodiment of the present invention is a vehicle suspension apparatus including: a shock absorber that has a cylinder outer tube; a dust cover whose upper area is fixed on an upper support side (on the side where an upper support is provided); and a coil spring that surrounds the dust cover, wherein the cylinder outer tube has a first engagement unit provided on a portion of the circumference of the cylinder outer tube. The dust cover is provided on a portion of the circumference of a lower area of the dust cover and has a second engagement unit that becomes engaged with the first engagement unit.

According to this embodiment, the first engagement unit is provided on a portion of the circumference of the cylinder outer tube, and the second engagement unit is provided on a portion of the circumference of the lower area of the dust cover. Thus, when the dust cover is moved in the shaft direction of the shock absorber so as to cover the cylinder outer tube, the second engagement unit can be moved in the shaft direction of the shock absorber on a portion where the first engagement unit is not formed and is allowed to pass an area where the first engagement unit is formed. Then, for example, by rotating the dust cover around the shaft of the cylinder outer tube, the first engagement unit and the second engagement unit can be engaged with each other, and the lower area of the dust cover can be locked to the cylinder outer tube.

A plurality of first engagement units may be formed around the cylinder outer tube, and a plurality of second engagement units are formed around the dust cover may be formed. A circumferential width of the first engagement units may be narrower than a circumferential interval of the second engagement units, and a circumferential width of the second engagement units may be narrower than a circumferential interval of the first engagement units. According to this embodiment, the plurality of second engagement units can be moved in the shaft direction of the shock absorber with respect to the plurality of first engagement units and can be allowed to pass an area where the first engagement units are formed. As a result, the first engagement units and the second engagement units can be engaged with each other at a plurality of portions, and the locking state thereof can be stabilized.

An abutting portion may be formed on at least one of the first engagement units and the second engagement units that regulates an engagement position in a circumference direction when the first engagement units and the second engagement units become engaged with each other. According to this embodiment, by engaging the first engagement units with the second engagement units until abutting against the abutting portion, whether or not the first engagement units and the second engagement units are sufficiently engaged with each other can be easily confirmed. Also, the positioning at the time of the engagement becomes easy, and the reliability of the engagement is improved.

A positioning member may be formed on at least one of the cylinder outer tube and the dust cover that determines a relative position of the cylinder outer tube and the lower area of the dust cover in the shaft direction of the shock absorber when the first engagement units and the second engagement units are engaged with each other. The positioning member can be formed, for example, around the shaft on the outer wall of the cylinder outer tube or the inner wall of the dust cover. When forming the positioning member on the outer wall of the cylinder outer tube, the positioning member can be formed on the depth side in the shaft direction of the shock absorber that is deeper than the first engagement units with respect to an end portion of the cylinder outer tube. Similarly, when forming the positioning member on the inner wall of the dust cover, the positioning member can be formed on the depth side in the shaft direction of the shock absorber that is deeper than the second engagement units with respect to the lower area of the dust cover. The positioning member may be formed on the entire circumference of the outer wall of the cylinder outer tube or the inner wall of the dust cover. Also, when forming the positioning member on the outer wall of the cylinder outer tube, the positioning member may be formed selectively on a portion where the first engagement units are not formed instead of on the entire circumference of the outer wall of the cylinder outer tube. Similarly, when forming the positioning member on the inner wall of the dust cover, the positioning member may be formed selectively on a portion where the second engagement units are not formed instead of on the entire circumference of the inner wall of the dust cover. According to this embodiment, when the dust cover is moved in the shaft direction of the shock absorber so as to cover the cylinder outer tube and the second engagement units are allowed to pass a portion, where the first engagement units are not formed, in the shaft direction of the shock absorber, the positioning of the relative position of the cylinder outer tube and the lower area of the dust cover can be easily performed, and the first engagement units and the second engagement units can be engaged with each other from that state.

Another embodiment of the present invention relates to a method of assembling a vehicle suspension apparatus. This method is a method of assembling a vehicle suspension apparatus that includes a shock absorber that has a cylinder outer tube, a dust cover, and a coil spring, including: disposing the coil spring around the shock absorber; inserting the dust cover between the cylinder outer tube and the coil spring in the shaft direction of the shock absorber; and engaging a first engagement unit provided on a portion of the circumference of the cylinder outer tube and a second engagement unit provided on a portion of the circumference of a lower area of the dust cover with each other by rotating the dust cover around the shaft of the shock absorber.

According to this embodiment, even without directly touching the cylinder outer tube or the lower area of the dust cover, by rotating the dust cover around the shaft of the shock absorber after moving the dust cover in the shaft direction of the shock absorber, the first engagement units and the second engagement units can be engaged with each other, and the cylinder outer tube and the lower area of the dust cover can be locked to each other.

Advantage of the Invention

According to the present invention, a vehicle suspension apparatus that allows for efficient locking of a lower area of a dust cover to a cylinder outer tube and a method of assembling the vehicle suspension apparatus can be provided.

BRIEF DESCRIPTION OF THE DRAWINGS

FIG. 4 are illustrative views illustrating a state before the engagement of first engagement units and second engagement units of the vehicle suspension apparatus according to the present embodiment, where

FIG. 5 are illustrative views illustrating a state after the engagement of first engagement units and second engagement units of the vehicle suspension apparatus according to the present embodiment, where

FIG. 6 are illustrative views illustrating an abutting portion of the vehicle suspension apparatus according to the present embodiment, where

BEST MODE FOR CARRYING OUT THE INVENTION

Figure 1A:
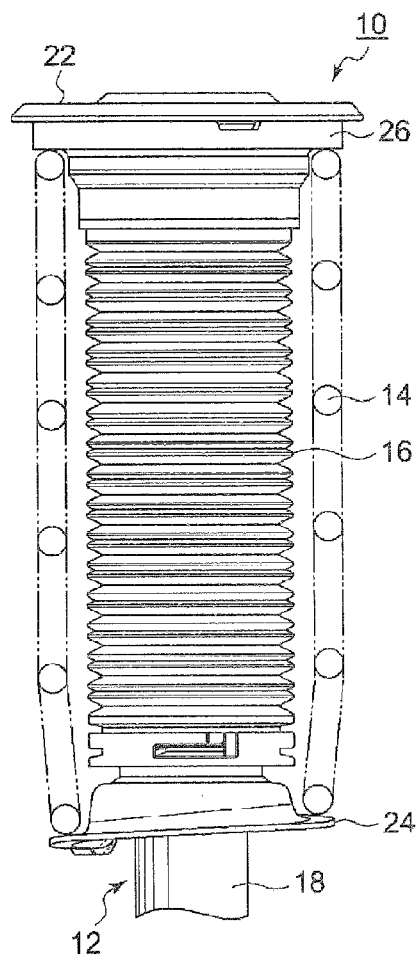
FIG. 1A is an external view of a vehicle suspension apparatus according to the present embodiment.

A detailed description of an embodiment to implement the present invention will be given with reference to the drawings. In the explanations of the figures, the same elements shall be denoted by the same reference numerals, and duplicative explanations will be omitted appropriately.

A vehicle suspension apparatus in the present embodiment has a structure where a lower area of a dust cover is locked to a cylinder outer tube of a shock absorber and where a piston rod portion of the shock absorber is substantially sealed. The engagement of the lower area of the dust cover with the cylinder outer tube can be achieved by rotating the dust cover around the shaft of the shock absorber (cylinder outer tube). The structure of the vehicle suspension apparatus according to the present embodiment is particularly suitable for a double wishbone type suspension, which tends to have a narrow gap between wires of a coil spring included in a vehicle suspension apparatus. However, the structure of the vehicle suspension apparatus according to the present embodiment is also applicable to another type, for example, a strut type suspension.

Figure 1B:
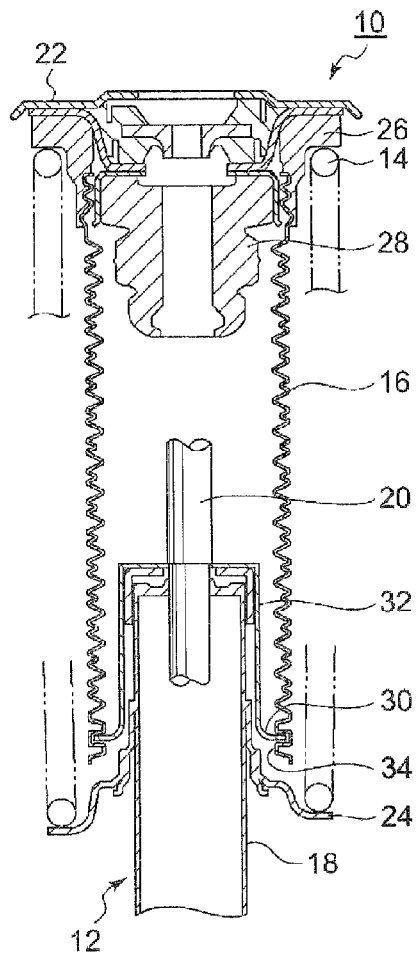
FIG. 1B is a schematic sectional view of the vehicle suspension apparatus according to the present embodiment.

FIG. 1A is an external view of a vehicle suspension apparatus (hereinafter, simply referred to as a suspension apparatus) 10 according to the present embodiment, and FIG. 1B is a schematic sectional view of the suspension apparatus 10 according to the present embodiment. The suspension apparatus 10 includes mainly a shock absorber 12, a coil spring 14, and a dust cover 16. A lower end portion of the shock absorber 12 is connected to a lower arm (not shown), and an upper end of a piston rod 20 that extends and retracts from the upper end side of a cylinder outer tube 18 of the shock absorber 12 is connected to an upper support 22. A lower spring seat 24 formed around the cylinder outer tube 18 supports a lower end of the coil spring 14 via a lower insulator (illustration omitted). An upper end of the coil spring 14 abuts on a lower surface of the upper support 22 via an upper insulator 26. The coil spring 14 mainly has a function of supporting the weight of a vehicle so as to absorb impacts. The shock absorber 12 has a function of attenuating the vibration of the coil spring 14.

Regarding the dust cover 16 according to the present embodiment, an example is shown where an upper area of the dust cover 16 is integrated with the upper insulator 26. In another example, the dust cover may be formed separately from the upper insulator, and the upper area of the dust cover may be connected to the side of the upper support 22, inserted between the upper insulator or the coil spring 14 and the upper support 22 and fixed, or inserted in a press-fitting portion of a bound stopper 28. The dust cover 16 is formed of, for example, a thermoplastic elastomer (rubber or the like), a synthetic resin, or the like and has, for example, a bellows shape. The bound stopper 28 can be disposed on the lower surface side of the upper support 22 inside the dust cover 16 and formed of a urethane material, a rubber material, or the like.

Figure 2:
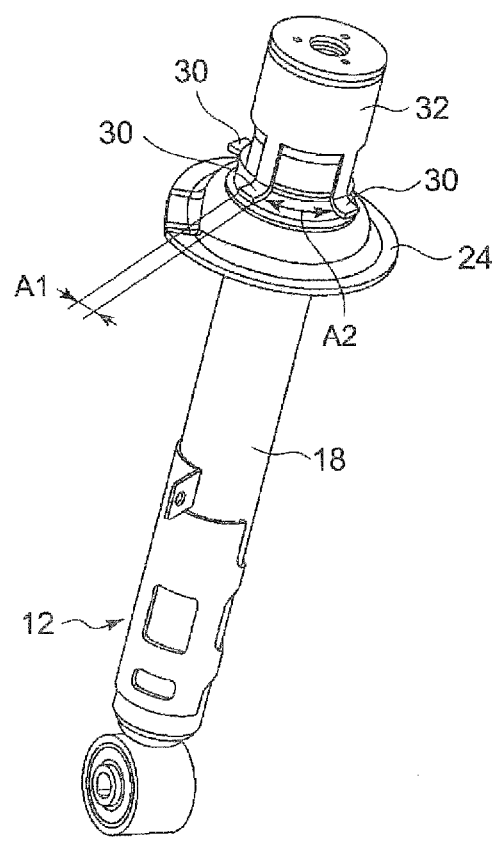
FIG. 2 is a perspective view of a shock absorber that constitutes the vehicle suspension apparatus according to the present embodiment.

FIG. 2 is a perspective view of the shock absorber 12 that constitutes the suspension apparatus 10. As described previously, the lower spring seat 24 that supports the coil spring 14 is fixed around the cylinder outer tube 18 of the shock absorber 12. In the shock absorber 12 according to the present embodiment, one or more first engagement units 30 are provided on a portion of the circumference of the cylinder outer tube 18 above the lower spring seat 24. In the case of an example shown in FIG. 2, four first engagement units 30 are formed and are protrusively formed facing outward on the outer circumferential wall of the cylinder outer tube 18 at almost equal intervals (three out of the four first engagement units 30 are shown), that is, at intervals of 90 degrees. In the case of FIG. 2, for example, the four first engagement units 30 are formed integrally with a cylindrical bump cap 32 made of metal, and the plurality of first engagement units 30 are formed around the cylinder outer tube 18 by putting the bump cap 32 on the cylinder outer tube 18.

Figure 3:
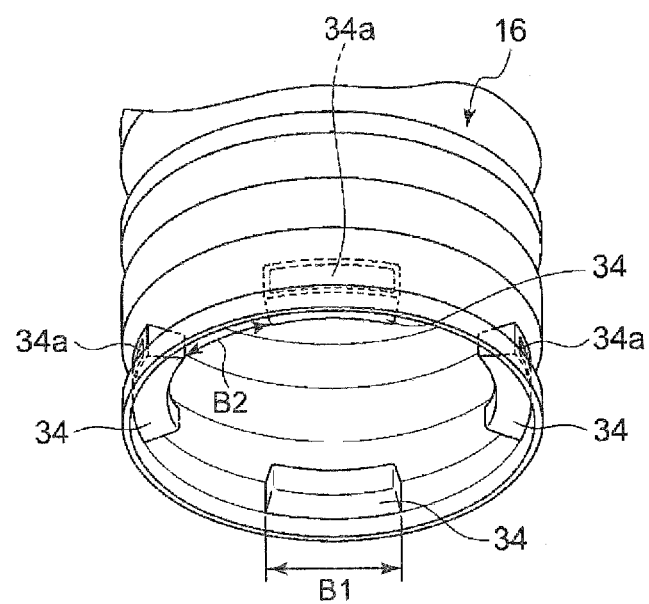
FIG. 3 is a perspective view of a lower area of a dust cover that constitutes the vehicle suspension apparatus according to the present embodiment.

FIG. 3 is a perspective view of a lower area of the dust cover 16. One or more second engagement units 34 that are engageable with the first engagement units 30 are formed on a portion of the circumference of the inner circumferential wall of the lower area of the dust cover 16. In the case of FIG. 3, as many second engagement units 34 as the number of the first engagement units 30 shown in FIG. 2 are formed. The second engagement units 34 are protrusively formed toward the inside on the inner circumferential wall of the dust cover 16. As described previously, the dust cover 16 can be made by resin molding. Therefore, by forming recessed portions 34*a* on the surface of the dust cover 16, the recessed portions 34*a* serve as the second engagement units 34 that project on the inner circumference side.

As shown in FIGS. 2 and 3, a circumferential width A1 of the first engagement units 30 is formed to be narrower than a circumferential interval B2 of the second engagement units 34. Also, a circumferential width B1 of the second engagement units 34 is formed to be narrower than a circumferential interval A2 of the first engagement units 30. Therefore, by moving the dust cover 16 in the shaft direction of the shock absorber 12 such that the lower area of the dust cover 16 covers the upper end side of the cylinder outer tube 18, the second engagement units 34 can pass between respective adjacent first engagement units 30. Then, by rotating the dust cover 16 around the shaft of the shock absorber 12 (cylinder outer tube 18), respective lower surfaces of the first engagement units 30 and respective upper surfaces of the second engagement units 34 can face each other and are engaged with each other.

Figure 4A:
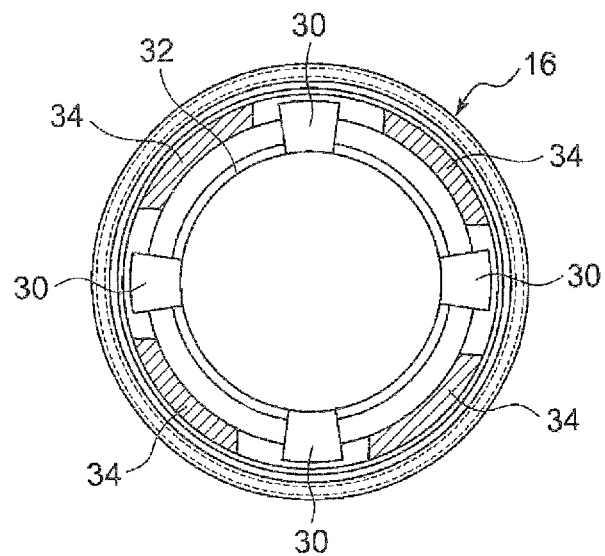
FIG. 4A is an illustrative view of engaging portions viewed from a lower surface, where
Figure 4B:
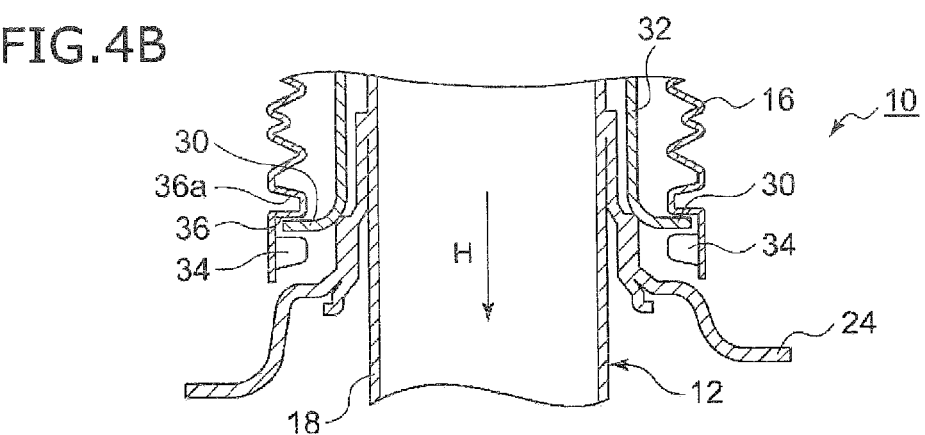
FIG. 4B is a sectional view of engaging portions, and where
Figure 4C:
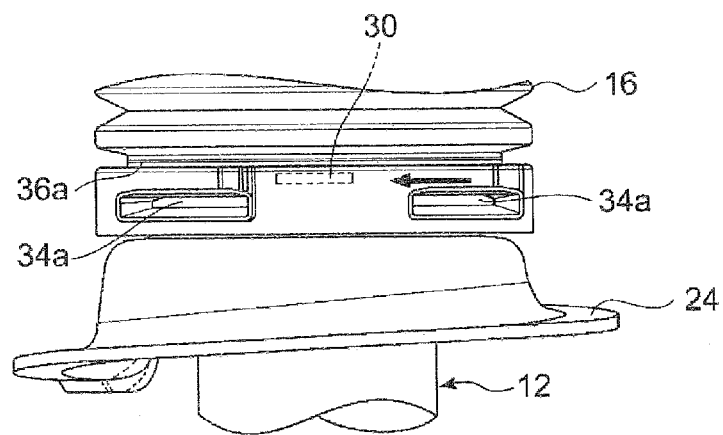
FIG. 4C is an external view of an engaging portion in the dust cover.
Figure 5A:
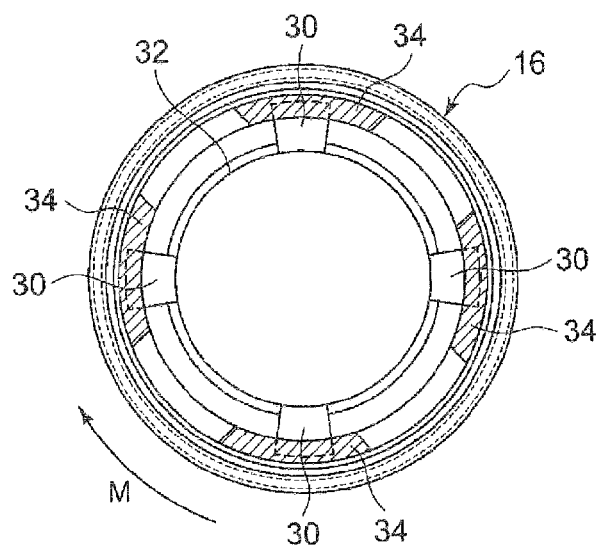
FIG. 5A is an illustrative view of engaging portions viewed from a lower surface, where

The state of the first engagement units 30 and the second engagement units 34 before and after the engagement is explained in detail with reference to FIGS. 4A through 4C and FIGS. 5A through 5C. In FIGS. 4A and 5A, the second engagement units 34 are hatched in order to clarify the formation positions of the second engagement units 34. FIGS. 4A through 4C are illustrative views illustrating a state before the engagement of the first engagement units 30 with the second engagement units 34, and FIG. 4A is an illustrative view of engaging portions viewed from a lower surface. As described previously, by rotating the dust cover 16 according to the present embodiment around the shaft, the first engagement units 30 and the second engagement units 34 become engaged with each other. Therefore, first, a state needs to be created where the second engagement units 34 pass between respective adjacent first engagement units 30, as shown in FIG. 4A. In other words, as shown in FIG. 4B, the second engagement units 34 of the dust cover 16 that are inserted in the direction of an arrow H from above the cylinder outer tube 18 need to be moved below the first engagement units 30 of the cylinder outer tube 18 without fail. In the present embodiment, a positioning member 36 is formed that abuts on the first engagement units 30 and determines a relative position of the cylinder outer tube 18 and the lower area of the dust cover 16 in the shaft direction of the shock absorber 12 when the second engagement units 34 pass between respective adjacent first engagement units 30, in the dust cover 16 as shown in FIG. 4B. In the case of the present embodiment, an example is shown where the positioning member 36 is formed by providing a recessed groove 36*a* that makes a dent on the outer wall surface of the dust cover 16, as shown in FIGS. 4B and 4C. This positioning member 36 is formed on the upper area side above the formation position of the second engagement units 34 and desirably formed at a position where a gap is formed that is slightly wider than the thickness dimension of the first engagement units 30 in the shaft direction. By forming the positioning member 36, the dust cover 16 only needs to be inserted until the respective upper surfaces of the first engagement units 30 abut on the lower surface of the positioning member 36 when the dust cover 16 is inserted from above the shock absorber 12 in the shaft direction so as to cover the cylinder outer tube 18. Thus, the cylinder outer tube 18 and the lower area of the dust cover 16 can be easily positioned without particularly paying attention to the relative position thereof. In other words, even when it is difficult to visually recognize the insertion position, the relative position can be considered to be correct by the feeling of the abutting of the first engagement units 30 against the positioning member 36. In another example, the positioning member may be formed on the cylinder outer tube 18 side. In this case, the positioning member is formed on the depth side in the shaft direction of the cylinder outer tube 18 that is deeper than the formation position of the first engagement units 30, and the respective lower surfaces of the second engagement units 34 that have passed between respective adjacent first engagement units 30 abut on the positioning member. Thus, the positioning member has the same effect. The positioning member needs to be formed on either of the side of the dust cover 16 and the side of the cylinder outer tube 18. However, the positioning member may be formed on the both sides.

Figure 5B:
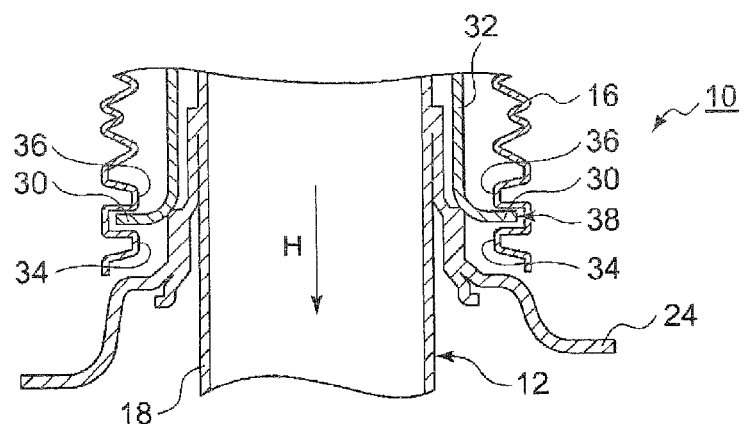
FIG. 5B is a sectional view of engaging portions, and where
Figure 5C:
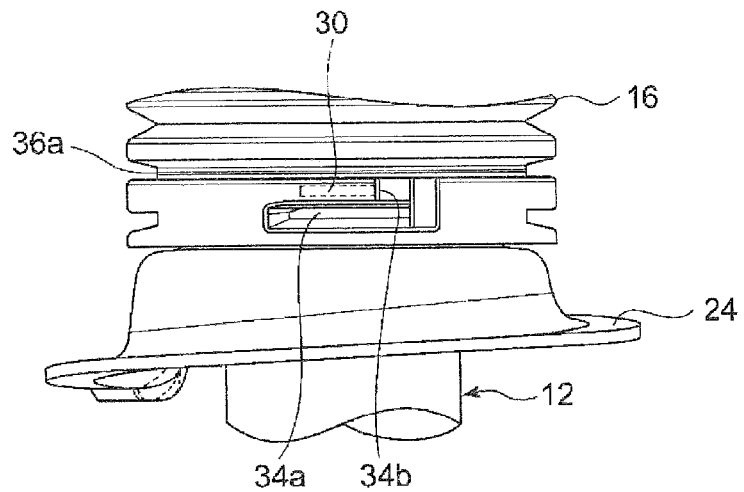
FIG. 5C is an external view of an engaging portion in the dust cover.

FIGS. 5A through 5C are illustrative views illustrating a state after the engagement of the first engagement units 30 with the second engagement units 34, and FIG. 5A is an illustrative view of engaging portions viewed from the lower surface. As shown in FIG. 4B, since the second engagement units 34 are inserted in the direction of the arrow H in the figure until the first engagement units 30 abut against the positioning member 36, the second engagement units 34 are located below the first engagement units 30 in the shaft direction of the shock absorber 12. Therefore, by rotating the dust cover 16 around the shaft of the shock absorber 12, for example, in the direction of an arrow M, the second engagement units 34 go around to the respective lower surfaces of the first engagement units 30, the lower area of the dust cover 16 becomes locked to the cylinder outer tube 18 in the shaft direction of the shock absorber 12, and the lower area of the dust cover 16 becomes fixed to the shock absorber 12.

The positioning member 36 that determines the relative position of the cylinder outer tube 18 and the lower area of the dust cover 16 may be formed only on a portion of the inner circumferential surface of the dust cover 16 where the second engagement units 34 are not formed or may be formed on the entire circumference of the inner circumferential surface of the dust cover 16. In the case of forming the positioning member 36 on the entire circumference of the inner circumferential surface of the dust cover 16, groove structures 38 are formed that accept the respective first engagement units 30 by the respective second engagement units 34 and the positioning member 36 on portions where the second engagement units 34 are formed as shown in FIGS. 5B and 5C. By employing a structure where the first engagement units 30 are slidingly inserted in the respective groove structures 38, a feeling of engagement obtained when the first engagement units 30 and the respective second engagement units 34 are engaged with each other and engagement stability can be improved. In the case of forming the groove structures 38, a taper is desirably provided such that a groove width of the groove structures 38 on the side where the respective first engagement units 30 start being accepted (a width in the shaft direction of the shock absorber 12) is wider than a groove width on the side where the first engagement units 30 stop being accepted, in order to facilitate the acceptance of the first engagement units 30 into the respective groove structures 38 when the dust cover 16 is rotated. For example, as shown in FIG. 5C, respective end portion areas of the second engagement units 34 that are on the side where the respective first engagement units 30 start being accepted are formed slantingly toward the end surface side of the dust cover 16. A taper provided to the groove structures 38 in this manner allows the first engagement units 30 to easily enter the respective groove structures 38 and become engaged with the respective second engagement units 34 even when the relative position of the cylinder outer tube 18 and the lower area of the dust cover 16 is slightly moved. As a result, the workability in the engagement can be improved.

Figure 6A:
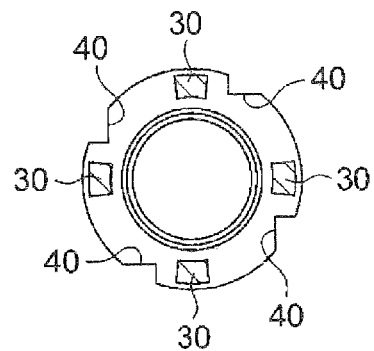
FIG. 6A is an illustrative view illustrating a state before the abutting, and where
Figure 6B:
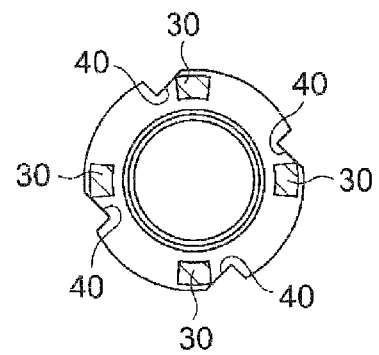
FIG. 6B is an illustrative view illustrating a state after the abutting.

If the dust cover 16 is unnecessarily rotated when engaging the first engagement units 30 with the second engagement units 34, the engagement of the first engagement units 30 with the second engagement units 34 ends up being released. Thus, abutting portions 40 are formed on the second engagement units 34 of the dust cover 16 according to the present embodiment that regulate an engagement position in the rotation direction (the circumference direction) at the time when the first engagement units 30 become engaged with the second engagement units 34. FIGS. 6A and 6B are illustrative views illustrating a state before and after the abutting of the first engagement units 30 against the respective abutting portions 40. For example, in the respective groove structures 38, the abutting portions 40 can be formed on the second engagement units 34 on the side where the first engagement units 30 stop being accepted in such a manner that the abutting portions 40 project in the shaft direction of the shock absorber 12. Even when the groove structures 38 are not formed, that is, when the positioning member 36 is not formed at the formation position of the second engagement units 34, the abutting portions 40 are formed on the second engagement units 34. By forming the abutting portions 40, the release of the engagement caused by excessive rotation of the dust cover 16 can be prevented at the time of engaging the first engagement units 30 with the second engagement units 34. Further, stopping of the rotation of the dust cover 16 by the abutting of the first engagement units 30 against the abutting portions 40 allows variation in the work of engaging the first engagement units 30 with the second engagement units 34 among products to be suppressed. In the case of moving the first engagement units 30 by rotating the dust cover 16, click portions that allow the first engagement units 30 to climb over projecting parts so that a click feeling can be obtained may be provided inside the groove structures 38 or on the upper surfaces of the second engagement units 34. By providing the abutting portions 40 or the click portions, the worker is able to easily recognize the completion of the work of rotating the dust cover 16. In other words, even when visual recognition of the cylinder outer tube 18 and the lower area of the dust cover 16 is difficult during the assembling work of engaging the first engagement units 30 with the second engagement units 34, an abutting feeling or a click feeling allows the worker to recognize the completion of the engaging work. In the above-described example, the abutting portions 40 are formed on the side where the second engagement units 34 are provided. However, the same advantage can be also obtained even when the abutting portions are formed on the side where the cylinder outer tube 18 is provided (on the side where the first engagement units 30 are provided).

Figure 7:
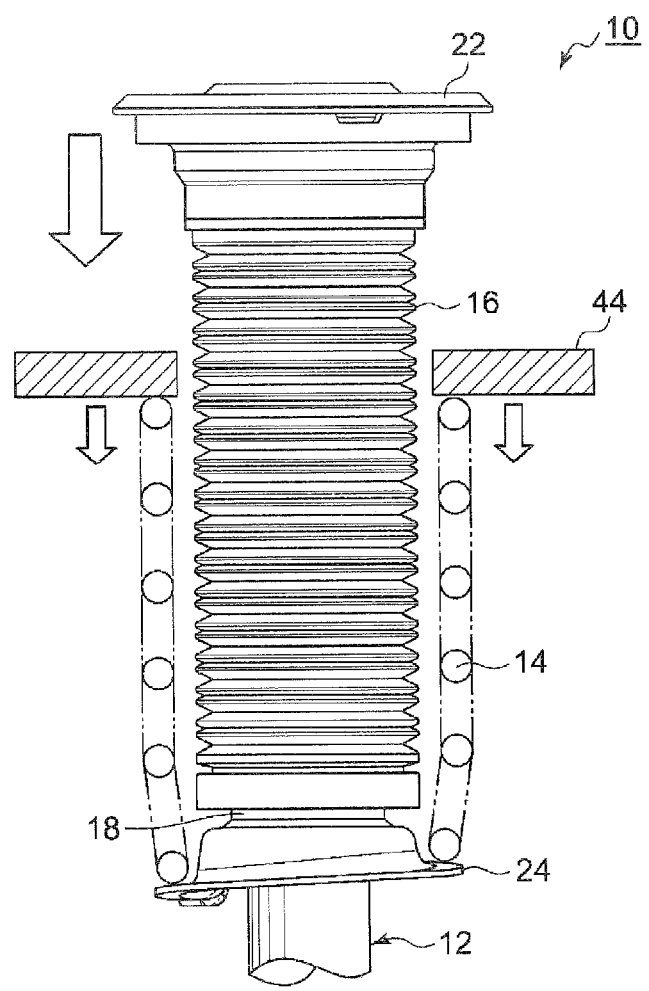
FIG. 7 is an illustrative view illustrating a method of assembling the vehicle suspension apparatus according to the present embodiment.

FIG. 7 is an illustrative view illustrating a method of assembling the vehicle suspension apparatus 10 according to the present embodiment. First, the coil spring 14 is disposed around the shock absorber 12. In this case, the coil spring 14 is supported by the lower spring seat 24 via the lower insulator while the coil spring 14 is having a natural length. Subsequently, the coil spring 14 is compressed toward the lower spring seat 24 by a predetermined amount by using, for example, a spring compressor 44 (only a head part thereof is illustrated). Subsequently, the dust cover 16 is inserted between the cylinder outer tube 18 and the coil spring 14 from above the shaft direction of the shock absorber 12. At this time, the dust cover 16 is inserted such that the first engagement units 30 and the second engagement units 34 are not in the same phase. In other words, the dust cover 16 needs to be inserted at a position where the first engagement units 30 and the second engagement units 34 do not overlap with each other in the shaft direction of the shock absorber 12. Accordingly, an identification structure is desirably formed so that the phase of the first engagement units 30 and the phase of the second engagement units 34 can be easily found out.

Figure 8:
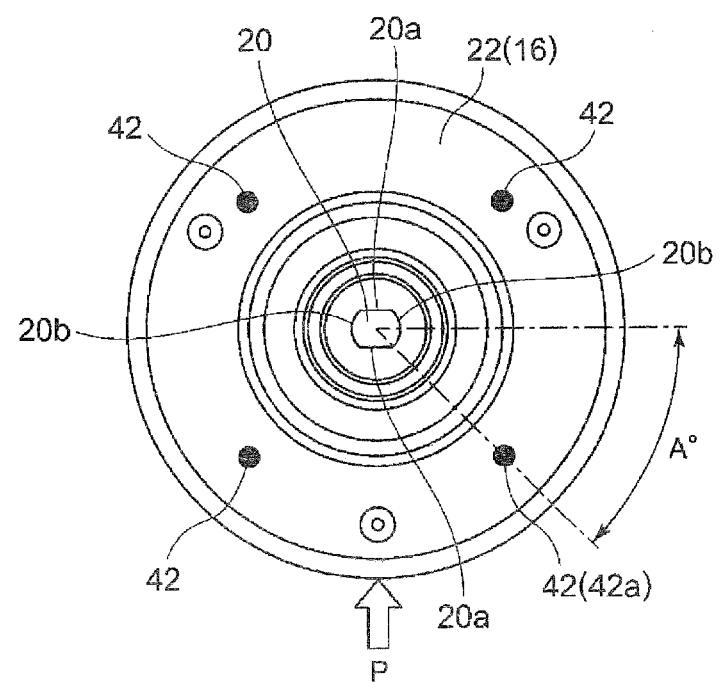
FIG. 8 is an illustrative view illustrating a position mark that can be used for phase matching of the first engagement unit and the second engagement unit at the time of assembling the vehicle suspension apparatus according to the present embodiment.

For example, in the case of putting the upper support 22 integrated with the dust cover 16 on the shock absorber 12 as shown in FIG. 7, the shape of an upper end of the piston rod 20 is shaped, for example, to have chamfered portions 20a at two parts as shown in FIG. 8. Then, the first engagement units 30 can be formed at respective positions that correspond to these parallel chamfered portions 20a and at respective positions that correspond to curved surface portions 20b whose phases are shifted by 90 degrees with respect to the chamfered portions 20a. Also, an inserting port having a shape that corresponds to the chamfered portions 20a and the curved surface portions 20b is also formed on the upper support 22. This structure allows for the determination of a phase (capable of rotation in 180 degrees) when the piston rod 20 (shock absorber 12) is inserted into the Inserting port of the upper support 22. Then, for example, the respective positions of the chamfered portions 20a of the piston rod 20 and the respective formation positions of the first engagement units 30 are associated with each other as the preparation of the assembling work. Meanwhile, in the upper support 22, the second engagement units 34 are formed at respective positions at which the phase is shifted by 45 degrees with respect to the parts corresponding to the chamfered portions 20a of the piston rod 20.

In the case of assembling the suspension apparatus 10, an arrangement is employed where, for example, a chamfered portion 20a on the upper end of the piston rod 20 of the shock absorber 12 is located on the near side of the worker (at the position of an arrow P). By disposing the shock absorber 12 with reference to the chamfered portion 20a in this manner, the respective positions of the first engagement units 30 are always determined with respect to the worker. In this state, the inserting port of the upper support 22 integrated with the dust cover 16 is positioned, and insertion work is performed. As a result, the second engagement units 34 are inserted in a state where the respective phases thereof are shifted by 45 degrees with respect to the first engagement units 30. Thus, the second engagement units 34 are allowed to pass between two respective adjacent first engagement units 30 without causing the second engagement units 34 to come into contact with the first engagement units 30.

In another example, for example, position marks 42 may be formed at intervals of 90 degrees on the upper surface of the upper support 22. On the upper support 22, these position marks 42 are provided, for example, at respective positions at which the phases thereof are shifted by 45 degrees with respect to the parts corresponding to the chamfered portions 20a of the piston rod 20. Then, the respective formation positions of the position marks 42 and the respective formation positions of the second engagement units 34 are set to be in the same phase. Meanwhile, in the shock absorber 12, for example, the respective positions of the chamfered portions 20a of the piston rod 20 and the respective formation positions of the first engagement units 30 are associated with each other as the preparation of the assembling work.

In the case of assembling the suspension apparatus 10, an arrangement is employed where, for example, a chamfered portion 20a on the upper end of the piston rod 20 of the shock absorber 12 is located on the near side of the worker (at the position of the arrow P). By disposing the shock absorber 12 with reference to the chamfered portion 20a in this manner, the respective positions of the first engagement units 30 are always determined with respect to the worker. In this state, the inserting port of the upper support 22 integrated with the dust cover 16 is positioned such that the inserting port matches the upper end shape of the piston rod 20, and the insertion work is performed. As a result, the second engagement units 34 are inserted in a state where the respective phases thereof are shifted by 45 degrees with respect to the first engagement units 30, allowing the second engagement units 34 to pass between two respective adjacent first engagement units 30 without causing the second engagement units 34 to come into contact with the first engagement units 30.

In FIG. 8, the shape of the piston rod 20 is characterized in order to allow the worker to recognize the respective positions of the first engagement units 30. Alternatively, position marks may be formed in the same way as in the upper support 22. Also, since the respective positions of the first engagement units 30 with respect to the worker can be determined before the insertion of the upper support 22 integrated with the dust cover 16, the position marks may be formed on other parts such as the surface of the cylinder outer tube 18. The position marks 42 may be those that can be recognized by colors or may be those that can be recognized by the shape of the surface thereof such as concaves and convexes. The position marks 42 shown in FIG. 8 are formed in accordance with the number of the second engagement units 34. Alternatively, the number of the position marks 42 may be one. A relationship between the shape of the upper end portion of the piston rod 20 and the respective formation positions of the first engagement units 30 and a relationship between the shape of an insertion port of the upper support 22 and the respective formation positions of the second engagement units 34 and the marks 42 only need to satisfy a positional relationship where the second engagement units 34 pass between two respective adjacent first engagement units 30 without causing the second engagement units 34 to come into contact with the first engagement units 30. Therefore, in the case of assembling the suspension apparatus 10, it is not always necessary to assemble the suspension apparatus 10 in such a manner that a chamfered portion 20a of the piston rod 20 is located on the near side of the worker. For example, the shock absorber 12 and the upper support 22 may be disposed in a positional relationship where the position marks 42 are located on the near side of the worker. Such an arrangement at the time of assembling allows the position marks 42 to serve as reference for the assembling work. Therefore, the operation efficiency can be improved, and the reliability at the time of the insertion can be also improved.

By rotating the dust cover 16 by a predetermined angle around the shaft of the shock absorber 12 after the dust cover 16 is inserted until the first engagement units 30 abut against the positioning member 36 described previously, the first engagement units 30 provided on a portion of the circumference of the cylinder outer tube 18 and the second engagement units 34 provided on a portion of the circumference of the lower area of the dust cover 16 become engaged with each other. For example, the dust cover 16 is rotated so that a position mark 42a shown in FIG. 8 is located on the near side of the worker (at the position of the arrow P). By this rotation, the first engagement units 30 and the second engagement units 34 become engaged with each other, and the lower area of the dust cover 16 becomes locked to the cylinder outer tube 18. If a position mark 42 is located on the near side of the worker when the piston rod 20 is inserted in the upper support 22, the engagement of the first engagement units 30 with the second engagement units 34 can be completed by rotation in a clockwise direction by a predetermined angle from the position. If a position mark 42 is not provided, the upper support 22 integrated with the dust cover 16 is rotated, for example, such that the chamfered portions 20a are rotated by a predetermined angle.

As described above, the work of inserting the dust cover 16 can be considered to be completed by an abutting feeling obtained when the first engagement units 30 abut against the positioning member 36. Also, the work of rotating the dust cover 16 can be considered to be completed by an abutting feeling obtained when the first engagement units 30 abut against the respective abutting portions 40. Further, the work of rotating the dust cover 16 can be also considered to be completed based on the rotation angle of the chamfered portions 20a or the rotation angle of the position marks 42. Therefore, even when it is difficult to directly touch the upper area of the cylinder outer tube 18 or the lower area of the dust cover 16, the engaging work can be completed easily. Also, even when visual recognition of the upper area of the cylinder outer tube 18 and the lower area of the dust cover 16 is difficult, by an abutting feeling obtained at the time of each work, the completion of the work can be easily confirmed. As a result, the work of locking the lower area of the dust cover 16 to the cylinder outer tube 18 can be efficiently performed.

In the example shown in FIG. 4A and the like, the number of the first engagement units 30 and the number of the second engagement units 34 are set to be four. However, these numbers can be appropriately changed. For example, the numbers may be one, three, five, six, or the like, and the same effects as those obtained in the above-described embodiment can be obtained. There is an advantage that molding can be facilitated when the number of the first engagement units 30 and the number of the second engagement units 34 are set to be even numbers and formed symmetrically. In particular, shape stability can be easily obtained in a symmetrical shape when forming the second engagement units 34 integrally at the time of forming the dust cover 16.

In the above-described embodiment, an example is shown where the first engagement units 30 formed on the cylinder outer tube 18 have a shape that projects outward from the outer wall of the cylinder outer tube 18 and the second engagement units 34 formed on the dust cover 16 have a shape that projects inward from the inner wall of the dust cover 16. These shapes are just an example and may be any shape as long as the first engagement units 30 and the second engagement units 34 become engaged with each other by relative rotation of the dust cover 16 and the cylinder outer tube 18 (shock absorber 12). For example, first engagement units having a C-shaped cross section that is directed inward may be formed on the outer wall of the cylinder outer tube 18, and second engagement units that project outward may be formed on the outer wall of the dust cover 16 so that the respective engagement units become engaged with each other. In this case, there is an advantage that the engagement units can be easily recognized visually.

Also, in the present embodiment, an example is shown where the first engagement units 30 are formed on the bump cap 32 and then put on the cylinder outer tube 18, as shown in FIG. 2. In another example, the first engagement units 30 may be formed directly on the outer wall of the cylinder outer tube 18, and the same advantage as that in the structure shown in FIG. 2 can be obtained. Also, as shown in FIG. 3, an example is shown where the second engagement units 34 are integrally formed on the inner wall of the dust cover 16. In another example, the second engagement units 34 may be formed separately and integrated with the dust cover 16, and the same advantage as that in the structure shown in FIG. 3 can be obtained.

The present invention should not be limited to each of the aforementioned embodiments, and various modifications such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

INDUSTRIAL APPLICABILITY

The present invention is applicable to a vehicle suspension apparatus and is particularly applicable to a vehicle suspension apparatus in which a lower area of a dust cover is locked to a cylinder outer tube.

DESCRIPTION OF THE REFERENCE NUMERALS 10 suspension apparatus,
12 shock absorber,
14 coil spring,
18 cylinder outer tube,
30 first engagement unit,
34 second engagement unit,
36 positioning member,
38 groove structure,
40 abutting portion

The invention claimed is:

1. A vehicle suspension apparatus comprising: a shock absorber that has a cylinder outer tube; a dust cover whose upper area is fixed on an upper support side; and a coil spring that surrounds the dust cover,
wherein the cylinder outer tube has a plurality of first engagement units provided around the cylinder outer tube, and
wherein the dust cover has a positioning member that abuts against the first engagement units and determines a relative position of the cylinder outer tube and a lower area of the dust cover in a shaft direction and a plurality of second engagement units that are provided around the lower area of the dust cover,
wherein a circumferential width of the first engagement units is formed to be narrower than a circumferential interval of adjacent second engagement units, and a circumferential width of the second engagement units is formed to be narrower than a circumferential interval of adjacent first engagement units,
wherein, by rotating the second engagement units relative to the first engagement units for engagement therewith, the lower area of the dust cover becomes locked to the cylinder outer tube in the shaft direction, and
wherein the first engagement units and the second engagement units are located above a lower end of the coil spring.

2. The vehicle suspension apparatus according to claim 1, wherein the positioning member is formed above the second engagement units in the dust cover, and
wherein the first engagement units are disposed in a gap formed in the shaft direction between the positioning member and the second engagement units.

3. The vehicle suspension apparatus according to claim 1, wherein the positioning member is formed on the entire circumference of the inner circumferential surface of the dust cover.

4. The vehicle suspension apparatus according to claim 1, wherein respective lower surfaces of the first engagement units and respective upper surfaces of the second engagement units face each other so that the first engagement units and the second engagement units become engaged with each other.

5. The vehicle suspension apparatus according to claim 1, wherein an abutting portion is formed on at least one of the first engagement units and the second engagement units that regulates an engagement position in a circumference direction when the first engagement units and the second engagement units become engaged with each other.

6. A method of assembling a vehicle suspension apparatus that comprises a shock absorber that has a cylinder outer tube, a dust cover, and a coil spring,
wherein the cylinder outer tube has a plurality of first engagement units provided around the cylinder outer tube, and
wherein the dust cover has a positioning member that abuts against the first engagement units and determines a relative position of the cylinder outer tube and a lower area of the dust cover in a shaft direction and a plurality of second engagement units that are provided around the lower area of the dust cover, wherein the first engagement units and the second engagement units are located above a lower end of the coil spring, comprising:

disposing the coil spring around the shock absorber;

inserting the dust cover between the shock absorber and the coil spring from above the shock absorber in a shaft direction until the positioning member abuts against the first engagement units; and bringing respective lower surfaces of the first engagement units and respective upper surfaces of the second engagement units to face each other by rotating the dust cover, which has been inserted, around the shaft of the shock absorber.

* * * * *